United States Patent [19]

Schmidlin

[11] Patent Number: 4,912,489

[45] Date of Patent: Mar. 27, 1990

[54] DIRECT ELECTROSTATIC PRINTING APPARATUS WITH TONER SUPPLY-SIDE CONTROL ELECTRODES

[75] Inventor: Fred W. Schmidlin, Pittsford, N.Y.

[73] Assignee: Xerox Corporation, Stamford, Conn.

[21] Appl. No.: 290,665

[22] Filed: Dec. 27, 1988

[51] Int. Cl.[4] .............................................. G01D 15/00

[52] U.S. Cl. .................................. 346/159; 346/160.1

[58] Field of Search ................ 346/158, 159, 1.1, 155, 346/139 C, 160.1

[56] References Cited

U.S. PATENT DOCUMENTS

| | | | |
|---|---|---|---|
| 3,689,935 | 9/1972 | Pressman et al. | 346/74 ES |
| 3,778,678 | 12/1973 | Masuda | 317/3 |
| 3,801,869 | 4/1974 | Masuda | 317/3 |
| 3,872,361 | 3/1975 | Masuda | 317/262 E |
| 4,491,855 | 1/1985 | Fujii et al. | 346/159 |
| 4,568,955 | 2/1986 | Hosoya et al. | 346/153.1 |
| 4,647,179 | 3/1987 | Schmidlin | 355/3 DD |

*Primary Examiner*—Arthur G. Evans

[57] ABSTRACT

A direct electrostatic printer having a printhead structure disposed intermediate a toner supply and a record substrate such that the control electrodes thereof are on the toner supply side of the printhead structure. The shield electrode is disposed on the side of the printhead nearest the record substrate. With this arrangement the control electrode is roughly four times more effective than prior art devices in repelling toner in the off state. Thus, a control voltage of 100 volts is sufficient to modulate the flow of toner through the apertures which previously required approximately 400 volts when operated in the normal forward direction.

Also, wrong sign toner accumulates on the side of the printhead structure nearest the supply of toner thus, allowing for toner removal from the printhead structure and its return to the toner supply which avoids having to deposit the wrong sign toner on the recording substrate.

10 Claims, 1 Drawing Sheet

DIRECT ELECTROSTATIC PRINTING APPARATUS WITH TONER SUPPLY-SIDE CONTROL ELECTRODES

BACKGROUND OF THE INVENTION

This invention relates to electrostatic printing devices and more particularly to electronically addressable printheads utilized for depositing developer in image configuration on plain paper substrates.

Of the various electrostatic printing techniques, the most familiar and widely utilized is that of xerography wherein latent electrostatic images formed on a charge retentive surface are developed by a suitable toner material to render the images visible, the images being subsequently transferred to plain paper.

A lesser known and utilized form of electrostatic printing is one that has come to be known as direct electrostatic printing (DEP). This form of printing differs from the aforementioned xerographic form, in that, the toner or developing material is deposited directly onto a plain (i.e. not specially treated) substrate in image configuration. This type of printing device is disclosed in U.S. Pat. No. 3,689,935 issued Sept. 5, 1972 to Gerald L. Pressman et al.

Pressman et al disclose an electrostatic line printer incorporating a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulatively isolated from every other segment of the segmented conductive layer. Selected potentials are applied to each of the segments of the segmented conductive layer while a fixed potential is applied to the continuous conductive layer. An overall applied field projects charged particles through the row of apertures of the particle modulator and the density of the particle stream is modulated according to the pattern of potentials applied to the segments of the segmented conductive layer. The modulated stream of charged particles impinge upon a print-receiving medium interposed in the modulated particle stream and translated relative to the particle modulator to provide line-by-line scan printing. In the Pressman et al device the supply of the toner to the control member is not uniformly effected and irregularities are liable to occur in the image on the image receiving member. Highspeed recording is difficult and moreover, the openings in the printhead are liable to be clogged by the toner.

U.S. Pat. No 4,491,855 issued on Jan. 1, 1985 in the name of Fujii et al discloses a method and apparatus utilizing a controller having a plurality of openings or slit-like openings to control the passage of charged particles and to record visible image by the charged particles directly on an image receiving member. Specifically disclosed therein is an improved device for supplying the charged particles to a control electrode that has allegedly made high-speed and stable recording possible. The improvement in Fujii et al lies in that the charged particles are supported on a supporting member and an alternating electric field is applied between the supporting member and the control electrode. Fujii et al purports to obviate the problems noted above with respect to Pressman et al. Thus, Fujii et al alleges that their device makes it possible to sufficiently supply the charged particles to the control electrode without scattering them.

U.S. Pat. No. 4,568,955 issued on Feb. 4, 1986 to Hosoya et al discloses a recording apparatus wherein a visible image based on image information is formed on an ordinary sheet by a developer. The recording apparatus comprises a developing roller spaced at a predetermined distance from and facing the ordinary sheet and carrying the developer thereon. It further comprises a recording electrode and a signal source connected thereto for propelling the developer on the developing roller to the ordinary sheet by generating an electric field between the ordinary sheet and the developing roller according to the image information. A plurality of mutually insulated electrodes are provided on the developing roller and extend therefrom in one direction. An A.C. and a D.C. source are connected to the electrodes, for generating an alternating electric field between adjacent ones of the electrodes to cause oscillations of the developer found between the adjacent electrodes along electric lines of force therebetween to thereby liberate the developer from the developing roller. In a modified form of the Hosoya et al device, a toner reservoir is disposed beneath a recording electrode which has a top provided with an opening facing the recording electrode and an inclined bottom for holding a quanity of toner. In the toner reservoir are disposed a toner carrying plate as the developer carrying member, secured in a position such that it faces the end of the recording electrode at a predetermined distance therefrom and a toner agitator for agitating the toner.

The toner carrying plate of Hosoya et al is made of an insulator. The toner carrying plate has a horizontal portion, a vertical portion descending from the right end of the horizontal portion and an inclined portion downwardly inclining from the left end of the horizontal portion. The lower end of the inclined portion is found near the lower end of the inclined bottom of the toner reservoir and immersed in the toner therein. The lower end of the vertical portion is found near the upper end of the inclined portion and above the toner in the reservoir.

The surface of the toner carrying plate is provided with a plurality of uniformly spaced parallel linear electrodes extending in the width direction of the toner carrying plate. At least three AC voltages of different phases are applied to the electrodes. The three-phase AC voltage source provides three-phase AC voltages 120 degrees out of phase from one another. The terminals are connected to the electrodes in such a manner that when the three-phase AC voltages are applied a propagating alternating electric field is generated propagates along the surface of the toner carrying plate from the inclined portion to the horizontal portion.

The toner which is always present on the surface of lower end of the inclined portion of the toner carrying plate is negatively charged by friction with the surface of the toner carrying plate and by the agitator. When the propagating alternating electric fluid is generated by the three-phase AC voltages applied to the electrodes, the toner is allegedly transported up the inclined portion of the toner carrying plate while it is oscillated and liberated to be rendered into the form of smoke between adjacent linear electrodes. Eventually, it reaches the horizontal portion and proceeds therealong. When it reaches a development zone facing the recording electrode it is supplied through the opening to the ordinary sheet as recording medium, whereby a visible image is formed. The toner which has not contributed to the formation of the visible image is carried along such as to fall along the vertical portion and then slide down into the bottom of the toner reservior by the gravitational force to return to a zone, in which the lower end of the inclined portion of the toner carrying plate is found.

U.S. Pat. No. 4,647,179 granted to Fred W. Schmidlin on Mar. 3, 1987 discloses a toner transporting apparatus for use in forming powder images on an imaging surface. The apparatus is characterized by the provision of a travelling electrostatic wave conveyor for the toner particles for transporting them from a toner supply to an imaging surface. The conveyor comprises a linear electrode array consisting of spaced apart electrodes to which a multiphase a.c. voltage is connected such that adjacent electrodes have phase shifted voltages applied thereto which cooperate to form the travelling wave.

U.S. Pat. No. 3,872,361 issued to Masuda discloses an apparatus in which the flow of particulate material along a defined path is controlled electrodynamically by means of elongated electrodes curved concentrically to a path, as axially spaced rings or interwound spirals. Each electrode is axially spaced from its neighbors by a distance about equal to its diameter and is connected with one terminal of a multi-phase alternating high voltage source. Adjacent electrodes along the path are connected with different terminals in a regular sequence, producing a wave-like, nonuniform electric field that repels electrically charged particles axially inwardly and tends to propel them along the path.

U.S. Pat. No. 3,778,678 also issued to Masuda relates to a similar device as that disclosed in the aforementioned '361 patent.

U.S. Pat. No. 3,801,869 issued to Masuda discloses a booth in which electrically charged particulate material is sprayed onto a workpiece having an opposite charge, so that the particles are electrostatically attracted to the workpiece. All of the walls that confront the workpiece are made of electrically insulating material. A grid-like arrangement of parallel, spaced electrodes, insulated from each other extends across the entire area of every wall, parallel to a surface of the wall and in intimate juxtaposition thereto. Each electrode is connected with one terminal of an alternating high voltage source, every electrode with a different terminal than each of the electrodes laterally adjacent to it, to produce a constantly varying field that electrodynamically repels particles from the wall. While the primary purpose of the device disclosed is for powder painting, it is contended therein that it can be used for electrostatic or electrodynamic printing.

The Masuda devices all utilize a relatively high voltage source (i.e. 5–10 KV) operated at a relatively low frequency, i.e. 50 Hz, for generating his travelling waves. In a confined area such as a tube or between parallel plates the use of high voltages is tolerable and in the case of the '869 patent even necessary since a high voltage is required to charge the initially uncharged particles.

In U. S. patent application Ser. No. 374,376, now abandoned and its foreign counterpart (Attorney's docket No. FX4072) filed in Japan on May 7, 1981 there is disclosed a device comprising an elongated conduit which utilizes travelling waves for transporting toner from a supply bottle to a toner hopper.

U. S. patent application Ser. No. 946,937 filed in the name of Schmidlin et al and assigned to the same assignee as the instant invention discloses an electrostatic printing appparatus including structure for delivering developer or toner particles to a printhead forming an integral part of the printing device. Alternatively, the toner particles can be delivered to a charge retentive surface containing latent images. The developer or toner delivery system is adapted to deliver toner containing a minimum quantity of wrong sign and size toner. To this end, the developer delivery system includes a pair of charged toner conveyors which are supported in face-to-face relation. A bias voltage is applied across the two conveyors to cause toner of one charge polarity to be attracted to one of the conveyors while toner of the opposite is attracted to the other conveyor. One of charged toner conveyors delivers toner of the desired polarity to an apertured printhead where the toner is attached to various apertures thereof from the conveyor.

In another embodiment of the '937 application, a single charged toner conveyor is supplied by a pair of three-phase generators which are biased by a dc source which causes toner of one polarity to travel in one direction on the elctrode array while toner of the opposite polarity travels generally in the opposite direction.

In an additional embodiment disclosed in the '937 application, a toner charging device is provided which charges uncharged toner particles to a level sufficient for movement by one or the other of the aforementioned charged toner conveyors.

The toner in a device such as disclosed in the '937 application is extracted from the "tops" of the clouds via the fringe fields that extend into the clouds from around the apertures. The efficiency of toner usage in a charged toner conveyor of the type disclosed in the '937 application is currently limited by the relatively dilute toner density in the "tips" of the toner clouds that are transported thereby.

U.S. patent application Ser. No. 926,129 filed in the name of Fred W. Schmidlin and assigned to the same assignee as the instant invention discloses a direct electrostatic printing apparatus including structure for delivering developer or toner particles to a printhead forming an integral part of the printing device. The printing device includes, in addition to the printhead, a conductive shoe which is suitably biased during a printing cycle to assist in the electrostatic attraction of developer through apertures in the printhead onto the copying medium disposed intermediate the printhead and the conductive shoe. The structure for delivering developer or toner is adapted to deliver toner containing a minimum quantity of wrong sign and size toner. To this end, the developer delivery system includes a conventional magnetic brush which delivers toner to a donor roll structure which, in turn, delivers toner to the vicinity of apertures in the printhead structure.

U.S. patent application Ser. No. 140,266 filed in the name of Fred W. Schmidlin and assigned to the same assignee as the instant invention discloses a direct electrostatic printing apparatus including structure for delivering developer or toner particles to a printhead forming an integral part of the printing device. The printing device includes, in addition to an apertured printhead, a conductive shoe which is suitably biased during a printing cycle to assist in the electrostatic attraction of developer through apertures in the printhead onto the copying medium disposed intermediate the printhead and the conductive shoe. Developer or toner is delivered to the printhead via a pair of opposed charged toner or developer conveyors. One of the conveyors is attached to the printhead and has an opening therethrough for permitting passage of the developer or toner from between the conveyors to areas adjacent the apertures in the printhead.

U.S. patent application Ser. No. 926,158 filed in the name of Fred W. Schmidlin and assigned to the same assignee as the instant invention discloses a direct electrostatic printing apparatus including structure for removing wrong sign developer particles from a printhead forming an an integral part of the printing device. The printing device includes, in addition to the printhead, a conductive shoe which is suitably biased during a printing cycle to assist in the electrostatic attraction of developer passing through apertures in the printhead onto the copying medium disposed intermediate the printhead and the conductive shoe. During a cleaning cycle, the printing bias is removed from the shoe and an electrical bias suitable for creating an oscillating electrostatic field which effects removal of toner from the printhead is applied to the shoe.

U.S. patent application Ser. No. 200,277 discloses a direct electrostatic printing (DEP) device wherein printing is optimized by presenting well charged toner to a charged toner conveyor which conveys the toner to an apertured printhead structure for propulsion therethrough. The charged toner conveyor comprises a plurality of electrodes wherein the electrode density (i.e. over 100 electrodes per inch) is relatively large for enabling a high toner delivery rate without risk of air breakdown. The printhead structure is constructed for minimization of aperture clogging. To this end the thickness of the printhead structure is about 0.025 mm and the aperture diameter (i.e. 0.15 mm) is large compared to the printhead thickness.

In each of the applications filed in the name of Schmidlin referred to above, the voltage signals are applied to addressable electrodes on the side of an aperture plate or printhead facing the recording paper. A shield electrode is provide on the opposite side (i.e. toner supply side) of the printhead. With such an arrangement the printing process has been carried out using control or signal voltages in the 300 to 400 voltage range and one driver for each hole in the printhead.

While it appears possible to make aperture plates which are compatible with the amorphous silicon technology to enable fabrication of the necessary electronics, much development work is still required to make this a reality.

Moreover, prior DEP processes require periodic cleaning of the printhead which becomes fouled due to the accumulation of wrong sign toner on the control electrodes. With the control electrodes disposed opposite the recording substrate, the wrong sign toner removed from the printhead must be discarded either onto the substrate (if substrate is roll fed) or to a waste container (if substrate is sheet fed.)

It will be appreciated that a DEP configuration which enables both the use of the less costly, lower voltage conventional chip electronics and a more desirable cleaning arrangement (i.e.one that is more tolerant of wrong sign toner) is highly desirable.

BRIEF DESCRIPTION OF THE INVENTION

Briefly, the present invention provides a DEP device that enables both the use of relatively low cost, low voltage conventional chip electronics and a more desirable (i.e.one that is more tolerant of wrong sign toner) cleaning arrangement which is highly desirable.

To this end, we have provided a DEP device wherein the control electrodes are disposed on the side of the printhead structure opposite the side where it is found in prior art devices. In other words, they are on the side of the printhead structure farthest from the recording substrate or on the toner supply side thereof. The shield electrode is disposed on the side of the printhead nearest the recording substrate. With this arrangement the control electrode is roughly four times more effective than prior art device in repelling toner in the off state. Thus, a control voltage of 100 volts is sufficient to modulate the flow of toner through the apertures which previously required approximately 400 volts when operated in the normal forward direction.

Also, wrong sign toner accumulates on the side of the printhead structure nearest the supply of toner thus, allowing for toner removal from the printhead structure and its return to the toner supply which avoids deposition on the recording substrate.

DETAILED DESCRIPTION OF THE DRAWINGS

Figure 1:
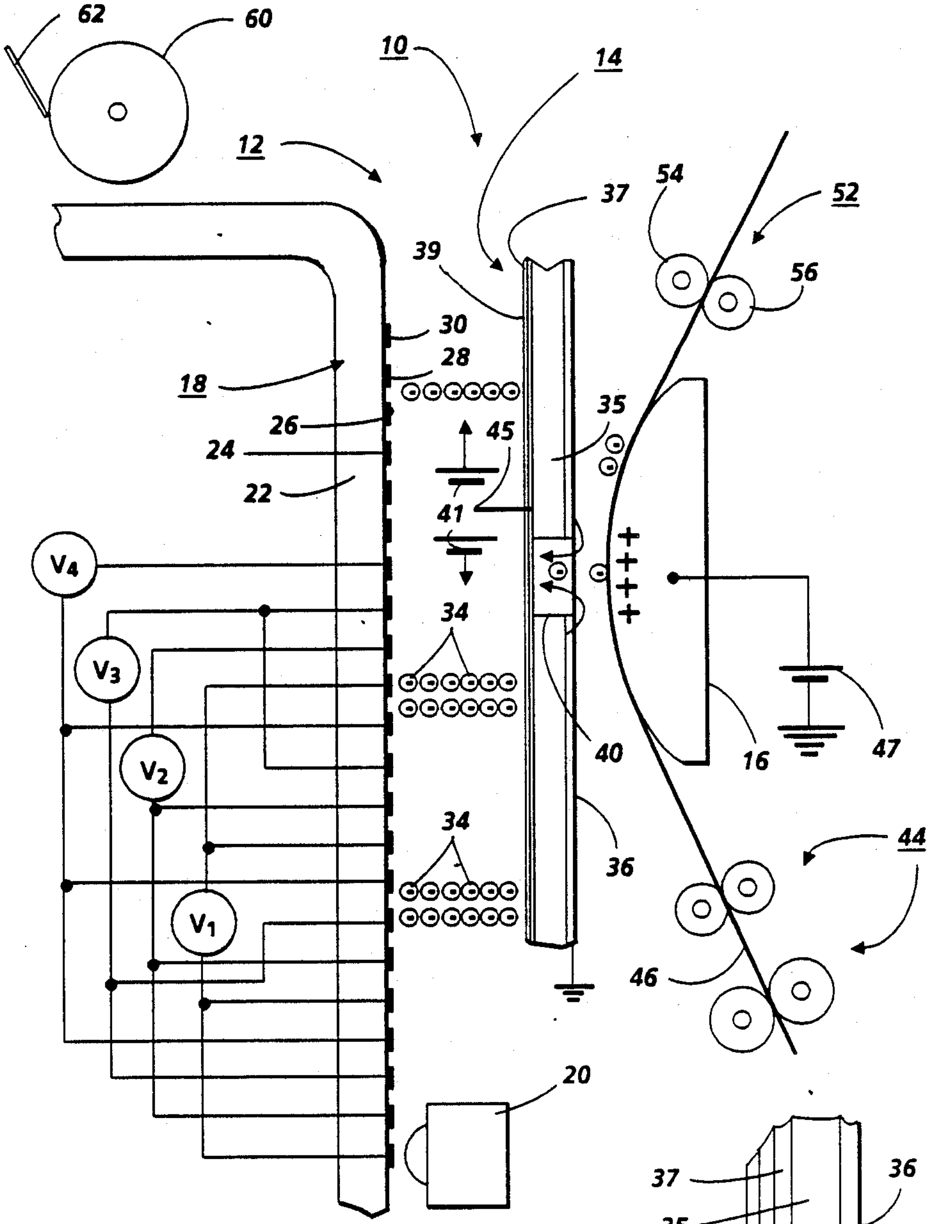
Figure 2:
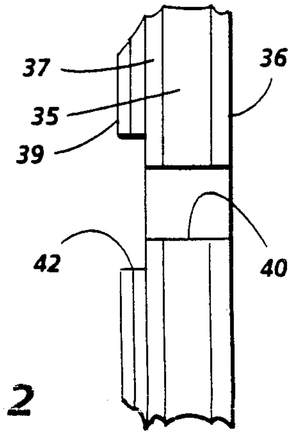

FIG. 1 is a schematic illustration of a printing apparatus representing the present invention; and FIG. 2 is an enlarged fragmentary view of a printhead structure forming a part of the invention.

DESCRIPTION OF THE PREFERRED EMBODIMENT OF THE INVENTION

Disclosed in FIG. 1 is an embodiment of a direct electrostatic printing apparatus 10 incorporating the invention.

The printing apparatus 10 includes a developer delivery or conveying system generally indicated by reference character 12, a printhead structure 14 and a backing electrode or shoe 16.

The developer delivery system 12 includes a toner supply 18 herein disclosed as a charged toner conveyor (CTC) 18 and a magnetic brush developer supply 20. The charged toner conveyor 18 comprises a base member 22 and an electrode array comprising repeating sets of electrodes 24, 26, 28 and 30 to which are connected A.C. voltage sources $V_1$, $V_2$, $V_3$ and $V_4$ which voltages are phase shifted one from the other so that an electrostatic travelling wave pattern is established. While the toner supply disclosed is a charged toenr conveyor it could also comprise a magnetic brush or jumping toner device.

The effect of the travelling wave patterns established by the conveyor 18 is to cause already charged toner particles 34 delivered to the conveyor via the developer supply 20 to travel along the charged conveyor to an area opposite the printhead apertures where they come under the influence of electrostatic fringe fields emanating from the printhead 14 and ultimately under the influence of the field created by the voltage applied to the shoe 16.

By way of example, the developer comprises any suitable insulative non-magnetic toner/carrier combination having Aerosil (Trademark of Degussa, Inc.) contained therein in an amount approximately equal to 0.3 to 0.5% by weight and also having zinc stearate contained therein in an amount approximately equal to 0 to 1% by weight.

The printhead structure 14 comprises a layered structure or member including an electrically insulative base member 35 fabricated from a polyimide film having a thickness in the order of 1 to 2 mils (0.025 to 0.50 mm). The base member is clad on the one side thereof with a continuous conductive layer or shield 36 of aluminum which is approximately 1 micron (0.001 mm) thick. The opposite side of the base member 36 carries segmented conductive layer 37 thereon which is fabricated from aluminum and has a thickness similar to that of the shield 38. The segmented conductive layer 37 comprises a number of individual control electrodes. A screening electrode 39 having an metalized insulative coating thereon is adhered over the control electrodes. The screening electrode thickness is in the order of 0.0005 to 0.001 inches (0.0125 to 0.025 mm). The total thickness of the printhead structure is in the order of 0.001 to 0.004 inch (0.027 to 0.10 mm).

A plurality of holes or apertures 40 (only one of which is shown in FIG. 1) approximately 0.15 mm in diameter are provided in the layered structure, except for the screening electrode. The apertures form an electrode array of individually addressable electrodes. With the shield grounded or preferably connected to the positive terminal of the DC power source 41 and with 0–100 positive volts applied via a DC power source 41 and switch 45 to an addressable electrode, toner is propelled through the aperture associated with that electrode. The apertures extend through the base 35 and the conductive layers 36 and 37. The screening electrode 39 which is provided with apertures 42 (FIG. 2) which are approximately 0.004 inch (0.10 mm) larger than the apertures 40 serves to suppress crosstalk in the printhead structure.

With a negative 100 volts applied to an addressable electrode via the DC power source 41 and the switch 45 toner is prevented from being propelled through the aperture. Addressing of the individual electrodes can be effected in any well known manner know in the art of printing using electronically addressable printing elements.

The electrode or shoe 16 has an arcuate shape as shown but as will be appreciated, the present invention is not limited by such a configuration. The shoe which is positioned on the opposite side of a plain paper recording medium 46 from the printhead 14 supports the recording medium in an arcuate path in order to provide an extended area of contact between the medium and the shoe.

The recording medium 46 may comprise roll paper or cut sheets of paper fed from a supply tray, not shown. The sheets of paper are spaced from the printhead 14 a distance in the order of 0.003 to 0.030 inch as they pass therebetween. The sheets 46 are transported in contact with the shoe 16 via edge transport roll pairs 44.

During printing the shoe 16 is electrically biased to a dc potential of approximately 400 volts via a dc voltage source 47.

At the fusing station, a fuser assembly, indicated generally by the reference numeral 52, permanently affixes the transferred toner powder images to sheet 46. Preferably, fuser assembly 52 includes a heated fuser roller 54 adapted to be pressure engaged with a back-up roller 56 with the toner powder images contacting fuser roller 54. In this manner, the toner powder image is permanently affixed to copy substrate 46. After fusing, a chute, not shown, guides the advancing sheet 46 to catch tray, also not shown, for removal from the printing machine by the operator.

A typical width for each of the electrodes for the travelling wave grid is 1 to 4 mils (0.025 to 0.10 mm). Typical spacing between the centers of the electrodes is twice the electrode width and the spacing between adjacent electrodes is approximately the same as the electrode width. Typical operating frequency is between 1000 and 10,000 Hz for 125 lpi grids 4 mil (0.10 mm) electrodes, the drive frequency for maximum transport rate being 2,000 Hz.

A typical operating voltage is relatively low (i.e.less than the Paschen breakdown value) and is in the range of 30 to 1000 depending on grid size, a typical value being approximately 500 V for a 125 lpi grid. Stated differently, the desired operating voltage is approximately equal to 100 times the spacing between adjacent electrodes.

While the electrodes may be exposed metal such as Cu or Al it is preferred that they be covered or overcoated with a thin oxide or insulator layer. A thin coating having a thickness of about half of the electrode width will sufficiently attenuate the higher harmonic frequencies and suppress attraction to the electrode edges by polarization forces. A slightly conductive over-coating will allow for the relaxation of charge accumulation due to charge exchange with the toner. To avoid excessive alteration of the toner charge as it moves about the conveyor, however, a thin coating of a material which is non-tribo active with respect to the toner is desirable. A weakly tribo-active material which maintains the desired charge level may also be utilized.

A preferred overcoating layer comprises a strongly injecting active matrix such as the disclosed in U.S. Pat. No. 4,515,882 granted in the name of Joseph Mammino et al on or about May 7, 1985 and assigned to the same assignee as the instant application. As disclosed therein, the layer comprises an insulating film forming continuous phase comprising charge transport molecules and finely divided charge injection enabling particles dispersed in the continuous phase. A polyvinylfluoride film available from the E. I. duPont de Nemours and Company under the tradename Tedlar has also been found to be suitable for use as the overcoat.

A biased toner extraction roll 60 is provided adjacent the charged toner transport 18 for removing excess toner from the transport. A scraper blade 62 is provided for removing toner particles from the extraction roll 60. The toner so extracted may be returned to the toner supply in a well known manner, not shown.

What is claimed is:

1. Direct electrostatic printing apparatus for forming toner images on an image receiving member, said apparatus comprising:

a printhead structure comprising a plurality of electrode structures;

a supply of toner disposed to one side of said printhead structure;

means for moving an image receiving member past said printhead structure, said printhead structure being positioned intermediate said supply of toner and said substrate moving means;

said plurality of electrode structures comprising control electrodes carried by said printhead structure on the toner supply side thereof; and means for applying suitable voltages to said plurality of electrodes for modulating the flow of toner through apertures in said printhead structure whereby toner is deposited on said substrate in image configuration.

2. Apparatus according to claim 1 wherein said means for applying suitable voltages applies approximately 100 volts to said control electrodes for terminating the movement of toner through said apertures.

3. Apparatus according to claim 2 wherein said plurality of electrodes comprises shield electrode structure carried by printhead structure on the substrate side thereof.

4. Apparatus according to claim 3 including means for minimizing crosstalk between said control electrodes.

5. Apparatus according to claim 4 wherein said means for minimizing crosstalk comprises a screening electrode secured over said control electrodes.

6. The method of forming toner images on an image receiving member, said method including the steps of:

providing a printhead structure comprising a plurality of electrode structures;

providing a supply of toner disposed to one side of said printhead structure;

providing means for moving an image receiving member past said printhead structure, said printhead structure being positioned intermediate said supply of toner and said substrate moving means;

said plurality of electrode structures comprising control electrodes carried by said printhead structure on the toner supply side thereof; and providing means for applying suitable voltages to said plurality of electrodes for modulating the flow of toner through apertures in said printhead structure whereby toner is deposited on said substrate in image configuration.

7. The method according to claim 6 wherein said means for applying suitable voltages applies approximately 100 volts to said control electrodes for terminating the movement of toner through said apertures.

8. The method according to claim 7 wherein said plurality of electrodes comprises shield electrode structure carried by printhead structure on the substrate side thereof.

9. The method according to claim 8 including means for minimizing crosstalk between said control electrodes.

10. The method according to claim 9 wherein said means for minimizing crosstalk comprises a screening electrode secured over said control electrodes.

* * * * *